Patented June 30, 1942

2,288,530

UNITED STATES PATENT OFFICE 2,288,530

SULPHONIC ACID AMIDE COMPOUND

Josef Klarer and Fritz Mietzsch, Wuppertal-Elberfeld, Germany, assignors to Winthrop Chemical Company, Inc., New York, N. Y., a corporation of New York No Drawing. Application September 1, 1938, Serial No. 227,887. In Germany September 8, 1937

3 Claims. (Cl. 260—397.7)

This invention relates to sulphonic acid amide compounds which yield stable, neutral, watersoluble salts in the form of their salts with bases.

It is known that benzene sulphonic acid amide compounds having in para-position to the sulphonic acid amide group an azo, amino or nitro group, are therapeutically useful because of their bactericidal action. The said compounds, however, show the disadvantage to be difficultly soluble in water; therefore it is difficult to use them for injections. It has already been tried to render these compounds watersoluble by the introduction of solubilizing groups, for instance, the carboxylic acid or the sulphonic acid groups; in most cases the therapeutic properties of the products obtained thereby are diminished or in some cases even disappear.

It has now been established that highly active bactericides which are readily and neutrally soluble in water are obtained by preparing such benzene sulfonic acid amide compounds which contain in para-position to the sulphonic acid amide group the nitrogen atom of a nitrogen-containing group and which contain at least one sulphamic acid group ($-NH.SO_3H$) in the molecule. The sulphamic acid group may also stand in para-position to the sulphonic acid amide group, while the nitrogen atom of the sulphamic acid group represents the nitrogen atom in the para-position to the sulphonic acid amide group.

The new compounds which are distinguished by their stability to alkalies are used for injection in the form of their watersoluble salts, for instance the alkali- and alkaline-earth metal or ammonium salts, or their salts with organic amines. Most of the compounds of this series are distinguished by their lack of color.

The therapeutic activity of the above specified sulphonic acid amide compounds having in the molecule at least one sulphamic acid group is surprising since, for instance by the introduction of the sulpho group into the amino group of 4-phenetedine the antipyretic properties of the 4-phenetedine disappear.

The above specified compounds are prepared by reacting halogen sulfonic acids or their esters with benzene sulphonic acid amides having in para-position to the sulphonic acid amide group a nitrogen-containing group the nitrogen atom of which is combined with the nucleus and which contain in the molecule at least a reactive amino group. The nitrogen-containing group in para-position to the sulphonic acid amide group may be represented by the aforementioned amino group. The reaction is advantageously carried out in the presence of tertiary amines, for instance pyridine, quinoline or dialkylanilines, or in the presence of inorganic acid-binding compounds, for instance, calcium carbonate, sodium bicarbonate, magnesium carbonate or alkali phosphates. The reaction may be carried out in the presence of indifferent solvents, for instance, benzene, toluene, carbon disulphide and ether. When used in excess, the tertiary amines may simultaneously serve as solvents.

Instead of the halogen sulphonic acids or their esters also their addition products to tertiary amines, for instance, pyridine, quinoline or dialkylanilines may be employed.

The benzene ring bearing the sulphonic acid amide group and the nitrogen atom in para-position thereto, may further be substituted, for instance by alkyl-, alkoxy-, halogen- and nitro groups. The nitrogen atom in para-position to the sulphonic acid amide group may be for instance the member of a nitro or amino group. If an amino group is present this amino group may also be substituted by alkyl-, aralkyl-, acyl- or acid ester groups which may contain further substituents. Such groups are for instance: methyl, ethyl, butyl, dodecyl, benzyl, aminobenzyl, hydroxyethyl, methoxyethyl, acetyl, benzenesulfonyl or phenylacetyl groups. Furthermore, the nitrogen atom may be the member of an azomethine group, such as for instance a substituted benzylideneamino group, or the urethane group.

The amino group of the sulphonic acid amide group may be a primary, secondary or tertiary amino group; it may be substituted, for instance by alkyl-, aryl-, aralkyl- or cycloalkyl groups, such as the methyl-, ethyl-, hydroxyethyl-, phenyl-, aminophenyl-, pyridine- or quinoline radicals. The two hydrogen atoms of the amide group may also be substituted by an alkylene group, so that a hydrogenated heterocyclic, for instance, a pyrrolidyl or piperidyl ring system is formed.

The amino group which is reacted with the halogen sulphonic acids or their esters may be the nitrogen-containing group in the para-position to the sulphonic acid amide group, or may take any position in the molecule. The said reactive amino group may be attached, for instance to a substituent of the sulphonic acid amide group, or to a radical substituting the nitrogen-containing group in para-position to the sulfonic acid amide group. Thus, for instance, the amino group of the sulphonic acid amide group may be substituted by aminoalkyl-, aminophenyl-, aminobenzyl- or aminonaphthalene groups. On the other hand, the nitrogen-containing group in para-position to the sulphonic acid amide group may for instance be substituted by an aminoalkyl- or aminoaryl- radical of the kind specified or by an aminoacyl radical, for instance, the aminoacetyl- or aminobenzoyl radical.

The new products above specified may also be obtained by reacting benene sulphonic acid esters or halides, having in para-position to the sulphonic acid amide group a nitrogen-containing group the nitrogen atom of which is combined with the nucleus, with amines which contain at least one reactive amino group and which further contain at least one sulphamic acid group. Such reactive sulphonic acid compounds are, for instance, para-nitro- or para-acetylaminobenzene sulphonic acid chlorides. The sodium salt of the para-aminobenzene sulphamic acid, for instance may be used as amine component in the said process.

It follows that the present invention relates to benzene sulphonamide compounds and their nuclear alkyl, alkoxy, halogen and nitro substitution products, which compounds contain in any position at least one sulphamino group and in the para-position to the sulphonamide group the nitrogen atom of a nitro, amino, sulphonamino or azomethine group or of alkyl-, aryl-, aralkyl- and acyl-amino groups or the corresponding radicals which are substituted by hydroxyl, etherified hydroxyl, amino, acylamino, sulphamino and carbalkoxy groups, and in which compounds the nitrogen atom of the sulphonamide group is substituted by hydrogen, alkyl, aryl, aralkyl, cycloalkyl, alkylene and the corresponding hydroxyl-, sulphonamide-, sulphamino and aminosubstituted radicals which radicals may combine more than one of the said sulphonamide radicals.

The invention is further illustrated by the following examples without being restricted thereto:

*Example 1.*—58 grams of chlorosulphonic acid are introduced drop by drop into 300 ccs. of pyridine which has been cooled with a mixture of ice and sodium chloride, while stirring. 86 grams of 4-aminobenzene sulphonic acid amide are added to the hot reaction mixture and the mixture is heated for one hour on the water bath. 200 ccs. of 40% aqueous caustic soda solution are added thereto, whereupon the pyridine is removed by steam distillation. After treatment with animal charcoal the mixture is filtered with suction, sodium chloride is added to the filtrate and the reaction product precipitated by the addition of ammonium chloride. The sodium salt of the 4-sulphaminobenzene sulphonamide precipitates in the form of white crystals. The said compound is obtained in the form of colorless crystals which are readily soluble in water on recrystallization from dilute sodium chloride solution or dilute methyl alcohol.

When using instead of the 4-aminobenene sulphonamide the 4-amino-2-methyl-5-methoxybenzene sulphonamide, the water-soluble sodium salt of the 4-sulphamino-2-methyl-5-methoxy-sulphonamide is obtained in beautiful colorless crystals.

*Example 2.*—71 grams of 4-(4'-aminobenzenesulphonyl - amino) - benzene - dimethylsulphonamide are introduced into a mixture of 200 ccs. of pyridine and 24 grams of chlorosulphonic acid. The mixture is heated for one hour on the boiling water bath, treated with 100 ccs. of aqueous caustic soda solution (40%) and the pyridine distilled off with steam. The reaction solution is treated with sodium chloride. Then the sodium salt of 4-(4'-sulphamino-benzenesulphonamido)-benene-dimethyl-sulphonamide is precipitated with ammonium chloride. The former is obtained in the form of large colorless crystals when recrystallized from methyl alcohol which neutrally dissolve in water.

*Example 3.*—55 grams of 4-(4'-amino-benzylamino)-benzenesulphonamide are introduced into a mixture of 200 ccs. of pyridine and 24 grams of chlorosulphonic acid. The mixture is heated on the water bath for one hour. After that time the reaction solution is treated with 80 ccs. of 40% aqueous caustic soda solution. The pyridine is then distilled off with steam. After purification of the residue with animal charcoal the solution is filtered with suction, the filtrate is treated with sodium chloride and the sodium salt of 4-(4'-sulphamino-benzylamino)-benzenesulphonamide is precipitated with ammonium chloride. The product is obtained from sodium chloride solution in the form of colorless crystals which neutrally dissolve in water.

When causing 4-nitrobenzene-sulphon-para-amino-anilide to react upon the addition product of chlorosulphonic acid and pyridine, the beautifully crystallizing sodium salt of 4'-(4-nitro-benzene-sulphonamido)-benzenesulphamic acid is obtained which is neutrally soluble in water.

*Example 4.*—49 grams of 4.4'-bis-(4''-amino-benzenesulphonamido)-diphenyl are introduced into a mixture of 24 grams of chlorosulphonic acid and 200 ccs. of pyridine. The mixture is heated on the water bath for one hour. After that time it is treated with 60 ccs. of 40% aqueous caustic soda solution. The pyridine is distilled off with steam. After the addition of sodium chloride the sodium salt of 4.4'-bis-(4''-sulphamino-benzene-sulphonamido) - diphenyl is separated. By recrystallization from sodium chloride solution it is obtained in the form of colorless crystals which are readily soluble in water with neutral reaction.

*Example 5.*—12 grams of chlorosulphonic acid are dropped into 100 ccs. of pyridine cooled with a mixture of ice and sodium chloride while vigorously stirring. 15 grams of 3-aminoacetanilide are added to the mixture which after dissolution is heated for one hour to 60–70° C. Then 40 ccs. of 40% aqueous caustic soda solution are added to the mixture, the pyridine is removed with steam and the mixture boiled for half an hour after the addition of 40 ccs. of caustic soda solution. 22.1 grams of 4-nitrobenzene-sulphochloride dissolved in acetone are added to the reaction mixture which has been cooled to 50° C. The solution takes a red brown coloration. After cooling to room temperature the sodium salt of 3'-(4-nitrobenzene - sulphonamido) - benzenesulphamic acid is precipitated by ammonium chloride. It forms a yellow-brown precipitate which may be recrystallized from slightly ammoniacal dilute sodium chloride solution.

When replacing the 4-nitrobenzenesulphochloride by 24 grams of 4-acetylaminobenzenesulphochloride the sodium salt of 3'-(4-acetylamino-benzenesulphonamido)-benzenesulphamic acid is obtained in beautiful colorless crystal leaflets.

We claim:

1. Para - sulphamino - benzene sulphonamide which product yields neutral aqueous solutions in the form of its alkali and alkaline earth metal, ammonium and amine salts.

2. A compound selected from the group consisting of the compounds of the formula

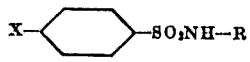

and their nuclear lower alkyl and lower alkoxy substitution products, in which formula X stands for a substituent of the group consisting of the sulphamino and sulphaminobenzylamino groups and their neutral water-soluble salts, and R stands for one of the substituents hydrogen and the phenylsulphamido radical.

3. 4-(4'-sulphamino-benzenesulphonamido)-benzene-dimethyl-sulphonamide, which product yields neutral aqueous solutions in the form of its alkali and alkaline earth metal, ammonium and amine salts.

JOSEF KLARER.
FRITZ MIETZSCH.